(12) United States Patent
Schanz et al.

(10) Patent No.: US 7,187,445 B2
(45) Date of Patent: *Mar. 6, 2007

(54) METHOD AND APPARATUS FOR OPTICALLY SCANNING A SCENE

(75) Inventors: Holger Schanz, Lindau (DE); Robert Kraus, Trostberg (DE); Wilfried Mehr, Lindau (DE)

(73) Assignee: Automotive Distance Control Systems GmbH, Lindau (DE)

( * ) Notice: Subject to any disclaimer, the term of this patent is extended or adjusted under 35 U.S.C. 154(b) by 423 days.

This patent is subject to a terminal disclaimer.

(21) Appl. No.: 10/762,198

(22) Filed: Jan. 20, 2004

(65) Prior Publication Data

US 2004/0212863 A1 Oct. 28, 2004

Related U.S. Application Data

(63) Continuation of application No. PCT/DE02/03028, filed on Aug. 9, 2002, and a continuation-in-part of application No. PCT/DE02/02675, filed on Jul. 18, 2002.

(30) Foreign Application Priority Data

Jul. 19, 2001  (DE)  ............................... 101 35 107
Aug. 23, 2001  (DE)  ............................... 101 41 363

(51) Int. Cl.
*G01N 21/55* (2006.01)
(52) U.S. Cl. ...................................................... 356/445
(58) Field of Classification Search ............... 356/2–33, 356/445; 359/211, 222
See application file for complete search history.

(56) References Cited

U.S. PATENT DOCUMENTS

| 2,222,937 | A | * | 11/1940 | Dimmick | 358/494 |
| 4,108,551 | A | * | 8/1978 | Weber | 356/4.01 |
| 4,606,601 | A | | 8/1986 | Starkweather | |
| 4,647,761 | A | * | 3/1987 | Cojan et al. | 250/203.1 |
| 4,668,859 | A | * | 5/1987 | Winterer | 250/221 |
| 4,878,720 | A | | 11/1989 | Hanke et al. | |
| 5,189,545 | A | | 2/1993 | Takata et al. | |

(Continued)

FOREIGN PATENT DOCUMENTS

DE   34 23 536   1/1986

(Continued)

*Primary Examiner*—Hwa (Andrew) Lee
*Assistant Examiner*—Isiaka O. Akanbi
(74) *Attorney, Agent, or Firm*—W. F. Fasse; W. G. Fasse

(57) ABSTRACT

A light beam is deflected by refraction and total internal reflection through a first prism, and projected through a first lens onto a scene that is to be scanned. The prism rotates, which varies the deflection angle and scans the beam across the scene along a scan line. Preferably, the successive side surfaces of the prism have different tilt angles relative to the rotation axis, so as to respectively deflect the beam in different deflection planes which cause successive scan lines of the beam across the scene. The emitted beam gives rise to a reflected beam from the scene, which is received through a second lens and deflected onto a photodetector through a second prism congruent to and rotating synchronously with the first prism. This apparatus is suitable as a laser scanning device for an object recognition system or a spacing distance regulation system of a motor vehicle.

24 Claims, 3 Drawing Sheets

U.S. PATENT DOCUMENTS

| | | | |
|---|---|---|---|
| 5,223,956 A * | 6/1993 | Kramer et al. | 359/17 |
| 5,227,784 A | 7/1993 | Masamori et al. | |
| 5,293,162 A | 3/1994 | Bachalo | |
| 5,309,212 A | 5/1994 | Clark | |
| 5,367,399 A | 11/1994 | Kramer | |
| 5,426,529 A | 6/1995 | Zelenka | |
| 5,757,501 A | 5/1998 | Hipp | |
| 5,864,391 A | 1/1999 | Hosokawa et al. | |
| 5,933,225 A | 8/1999 | Yamabuchi | |
| 6,456,024 B1 | 9/2002 | Schmider et al. | |
| 6,937,375 B2 * | 8/2005 | Schanz | 359/211 |
| 2004/0222366 A1 | 11/2004 | Frick | |
| 2004/0233491 A1 | 11/2004 | Schanz et al. | |
| 2004/0240020 A1 | 12/2004 | Schanz | |

FOREIGN PATENT DOCUMENTS

| | | |
|---|---|---|
| DE | 37 07 023 | 9/1988 |
| DE | 40 15 920 | 11/1990 |
| DE | 41 40 716 | 6/1992 |
| DE | 41 15 747 | 11/1992 |
| DE | 41 32 025 | 4/1993 |
| DE | 43 04 499 | 9/1993 |
| DE | 42 39 061 | 5/1994 |
| DE | 195 30 281 | 2/1997 |
| DE | 197 13 826 | 10/1997 |
| EP | 0138646 | 4/1985 |
| EP | 0805357 | 11/1997 |
| EP | 1104950 | 6/2001 |
| GB | 1562190 | 3/1980 |
| JP | 55-046712 | 4/1980 |
| JP | 60-079312 | 5/1985 |
| JP | 62-008119 | 1/1987 |
| JP | 09-021872 | 1/1997 |
| JP | 10-186260 | 7/1998 |
| WO | WO92/05455 | 4/1992 |
| WO | WO93/06517 | 4/1993 |

* cited by examiner

METHOD AND APPARATUS FOR OPTICALLY SCANNING A SCENE

CROSS-REFERENCE TO RELATED APPLICATIONS

This application is a Continuation-In-Part under 35 U.S.C. §120 of PCT International Application PCT/DE02/02675, filed on Jul. 18, 2002, and PCT International Application PCT/DE02/03028, filed on Aug. 9, 2002, both of which designated the United States, and both of which were published in a language other than English. The entire disclosures of both of these PCT International Applications are incorporated herein by reference.

PRIORITY CLAIM

Through the above identified PCT International Applications, this application is based on and claims the priority under 35 U.S.C. §119 of German Patent Application 101 35 107.0, filed on Jul. 19, 2001, and German Patent Application 101 41 363.7, filed on Aug. 23, 2001. The entire disclosures of both of the German Priority Applications are incorporated herein by reference.

FIELD OF THE INVENTION

The invention relates to a method as well as an apparatus for scanning a scene or image with an optical beam so as to detect objects or other information in the scene or image.

BACKGROUND INFORMATION

German Patent Publication DE 41 15 747 C2 discloses a method and an apparatus of the above generally mentioned type. The disclosed apparatus includes a transmitting or emitting part for generating, emitting and deflecting a scanning beam that is to scan the scene of interest, and a receiving part for detecting a reflected beam that arises as a reflection of the scanning beam from objects in the scene. In this context, the emitting part comprises a beam generating source, which emits a laser beam as the scanning beam, as well as two prisms arranged or interposed in the beam path of the scanning beam. One of these two prisms is rotated about a vertical rotation axis and the other prism is rotated about a horizontal rotation axis, so as to deflect and thereby scan the scanning beam in horizontal and vertical directions respectively. Namely, the prism rotating about the vertical axis achieves a horizontal moving deflection or scanning of the scanning beam, while the prism rotating about the horizontal rotation axis achieves a vertical moving deflection or scanning of the scanning beam. Both of these prisms comprise planar parallel side surfaces, on which the scanning beam is refracted. Due to the parallelism of the respective side surfaces, these side surfaces will cause a parallel shifting or translation of the scanning beam by a value that is respectively dependent on the angular position or orientation of the respective prism. Thereby, the prism rotating about the vertical rotation axis causes a horizontal shifting or translation, while the prism rotating about the horizontal rotation axis causes a vertical shifting or translation of the scanning beam. Thereafter, i.e. downstream of the prisms, the scanning beam is directed through a convergent lens and thus projected onto the scene that is to be scanned.

A substantial disadvantage of the known apparatus and method is that two separate prisms are required for achieving the horizontal and vertical deflection or scanning of the scanning beam. These two prisms require a substantial structural space and are each subject to operational interferences or malfunctions. Each prism can also successively add optical distortions or aberrations to the scanning beam.

The Japanese Patent Publication JP 62-008119 A discloses a method and an apparatus including a polygonal mirror having several mirrored side surfaces that are respectively tilted at different angles relative to a rotation axis of the rotating mirror. A scanning beam directed at the rotating polygonal mirror is thus reflected successively from the differently angled mirrored side surfaces, whereby a two-dimensional scanning of a scene by the reflected scanning beam can be achieved. The scanning beam may be a laser beam. This known method and apparatus, however, have the disadvantage, that each one of the mirrored side surfaces of the polygon mirror must be relatively large in order to achieve a deflection of the entire laser beam over the required angular range of the scanning field.

Furthermore, various mirror arrangements having rotatable mirror surfaces arranged at a tilt angle in the beam path of a scanning beam so as to totally reflect the scanning beam and thereby scan a scene with the reflected beam are known in the prior art, for example as disclosed in JP 10-186260 or DE 197 13 826 A1.

It is also known in the prior art to use prism arrangements for scanning a scene, for example as disclosed in EP 0,138,646 A1 or GB 1,562,190, whereby, however, a total reflection of the scanning beam does not arise in any case.

SUMMARY OF THE INVENTION

In view of the above, it is an object of the invention to provide a method and an apparatus of the above mentioned general type, which is simpler, more economical and compact or space-saving, and which achieves the optical scanning of a large angular range of a scanning field of a scene that is to be scanned. The invention further aims to avoid or overcome the disadvantages of the prior art, and to achieve additional advantages, as apparent from the present specification. The attainment of these objects is, however, not a required limitation of the present invention.

The above objects have been achieved according to the invention in an apparatus for optically scanning a scene, whereby the apparatus includes a transmitting or emitting part for emitting a scanning beam that is moved or scanned over the scene, and a receiving part for detecting a reflected beam that arises from a reflection of the scanning beam on an object or feature or artifact of the scene. Throughout this application, the term "scene" is used broadly to cover any optically scannable pattern of information (e.g. a scene, image, pattern, arrangement of objects, or the like), and the "object" in the scene may be any feature of the scene that yields optically scannable information. The terms "optical" and "light" are not limited to the visible portion of the electromagnetic spectrum, but rather include visible light as well as invisible infrared radiation, for example, or any radiation that can be deflected through a prism.

The emitting part of the apparatus comprises an optical beam source for generating the scanning beam, and a first prism element, e.g. a first prism, that is rotatable about a rotation axis. This first prism is transparent and located in the beam path of the scanning beam generated and emitted by the beam source, so that the scanning beam penetrates into the prism. More particularly, the first prism is positioned in the beam path of the scanning beam in such a manner so the scanning beam penetrates into the interior of the prism, and there is internally reflected by total reflection on one of the side surfaces of the prism, whereby the beam is deflected. Due to the rotation of the prism, the reflection angle of the total reflection on the respective reflecting side surface of the prism varies along with the rotation, whereby the deflected scanning beam directed from the prism toward the scene is successively scanned or swung over the scene in a direction perpendicular to the rotation axis of the prism. Furthermore, in addition to the internal total reflection from one of the side surfaces, the scanning beam is further deflected by refraction as it enters into the prism through another side surface, and/or as it exits from the prism through another side surface of the prism. Thus, the total deflection of the scanning beam by the prism, from the initial beam direction as generated by the beam source, to the final beam direction being emitted toward the scene, comprises the internal total reflection from one of the side surfaces of the prism, and the refraction of the scanning beam upon entering and/or exiting the prism through one or more other side surfaces thereof.

In a particular preferred example embodiment of the inventive apparatus, the first prism includes plural side surfaces that are respectively tilted at different tilt angles relative to the rotation axis of the prism. As the prism rotates, the scanning beam will be deflected as described above and thereby scanned across the scene in the scanning direction perpendicular to the rotation axis. Additionally, at the end of each scan line, the emitted beam will be shifted line-by-line to the beginning of a next successive scan line in a direction parallel to the rotation axis. Namely, as the prism rotates, the incident scanning beam penetrating into the prism will be successively reflected from successive ones of the prism side surfaces, which respectively have different tilt angles as mentioned above. Due to the different tilt angles, the successive prism side surfaces will reflect the scanning beam respectively along different scanning planes that are angularly shifted or tilted relative to one another in a direction parallel to the rotation axis. The particular angular positions of the respective scanning planes will be determined by the respective tilt angles of the several side surfaces of the prism. A shift from one scanning plane to the next takes place each time the incident scanning beam penetrating into the prism shifts from one side surface to the next due to the rotation of the prism, i.e. when one side surface moves out of the beam path and the next side surface moves into the beam path due to the rotation of the prism. As a result, the deflected scanning beam will scan sequentially line-by-line in successive scan lines across the scene.

Preferably, the tilt angles of the successive side surfaces of the prism are specifically selected so that the scene can be scanned line-by-line without gaps between the successive scan lines. The width of each scan line is determined by the beam divergence or beam width of the scanning beam as it impinges on the scene. Thus, the tilt angles and the successive step-wise variation or difference of the tilt angles of successive side surfaces of the prism must be selected depending on the optics of the system, the intended operating distance from the apparatus to the scene to be scanned, and the like, to ensure that there will be no gaps between successive scan lines. It has been determined that a particular preferred and advantageous embodiment of the inventive apparatus includes a prism having a triangular cross-section, i.e. with three side surfaces arranged to be rotatable successively into the beam path of the scanning beam, whereby these three side surfaces are respectively tilted by 2°, 3° and 4° relative to the rotation axis of the prism.

In a further advantageous embodiment of the invention, the emitting part of the apparatus additionally includes a lens arrangement interposed in the beam path of the deflected scanning beam exiting from the prism, for converging, diverging, collimating, or focusing the deflected scanning beam onto the scene.

According to the invention, the receiving part of the apparatus can be embodied substantially the same as the emitting part, except that the beam source of the emitting part is replaced by a photodetector in the receiving part. Thus, the receiving part preferably comprises a second prism element, e.g. a second prism, that is configured exactly the same as, and also rotates synchronously with, the first prism of the emitting part. This second prism is interposed in the beam path of the reflected beam, so that the second prism receives and deflects the moving reflected beam onto the stationary photodetector. The photodetector can be a single cell detector, which receives the optical information of the reflection of the image or scene as a substantially continuous progression of optical intensity values, as the scanning point is scanned successively line-by-line across the scene as described above. The successive optical intensity information received by the photodetector can then be evaluated in an analog manner, or can be converted into a bit sequence of digitized bits representing the successive reflection intensity values of successive pixels along the successive scanning lines of the scene or image.

The two prisms of the emitting and receiving parts thereby rotate about the same rotation axis, or the second prism, may rotate around its own separate second rotation axis that is parallel to the rotation axis of the first prism. Furthermore, in an especially simple embodiment, the first prism element of the emitting part and the second prism element of the receiving part are embodied as two portions of the same single monolithic prism body. In that case, the two conceptual prism portions can physically overlap each other in the single monolithic prism body, with just enough beam separation between the emitted beam and the scanning beam in the prism body to allow for the distinct locations of the beam source and the photodetector. Alternatively, the two individual first and second prisms can be joined together, e.g. being glued or otherwise fixed together, so as to rotate synchronously together about the same rotation axis. The two prisms preferably both consist of the same material, such as glass, a transparent plastic, a crystal material, or any conventionally known prism material. The two prisms may be rotated by any conventionally known motor or rotational drive arrangement.

Also similar to the emitting part, the receiving part may further include a lens arrangement interposed in the beam path of the reflected beam for converging, diverging, collimating or focusing the received reflected beam onto the second prism, from which the reflected beam is deflected onto the photodetector.

The apparatus according to the invention is especially suitable for use as a component in a spacing distance radar or measuring arrangement of a system for regulating the spacing distance between successive motor vehicles, or for an object recognition system for recognizing objects in the environment surrounding a motor vehicle.

In comparison to conventionally known apparatuses using rotating polygonal mirrors, the inventive apparatus has the advantage that it provides a larger light emission surface, and thus a larger angular scanning field, while using a prism having smaller dimensions than the conventional polygonal mirror. Simultaneously, the inventive apparatus thus has a reduced sensitivity to contamination or fouling of the surfaces of the various optical components, and additionally presents a reduced danger of laser beam injury to the eyes of any person who looks at the emitting portion of the apparatus.

The above objects have further been achieved according to the invention in a method for optically scanning a scene. This method may, for example, be carried out using the inventive apparatus as described herein. Thus, the scanning light beam is deflected by total internal reflection within a rotating prism, namely total reflection from one of the side surfaces of the prism, such that the deflected scanning beam is directed toward the scene to be scanned, and is moved or scanned across the scene due to the rotation of the prism. In addition to the total reflection of the scanning beam in the interior of the body of the prism, the deflection further generally includes a refraction of the scanning beam upon entering into and exiting from the body of the prism. Thus, the overall deflection may have a complex or compound nature. In any event, the movement of the deflected light beam across the scene results from the rotation of the prism, which causes a continuous variation of the reflection angle and the refraction angle of the light beam along each respective side surface of the prism.

In an advantageous further development of the inventive method, at least a portion of the scanning light beam is reflected from the scene to form a reflected beam which is then deflected by total reflection internally from a side surface of the above mentioned rotating prism or a further second rotating prism, Thereby, the deflected reflected light beam is directed onto a photodetector. In this regard, the reflected light beam may be directed through a lens arrangement interposed between the scene and the receiving prism. Thereby, if two separate prisms are used, they are preferably configured the same and are rotated with the same rotation speed in the same rotation direction about the same rotation axis. Alternatively, the two prisms may be rotated about two distinct rotation axes that are parallel to each other. The scanning light beam is preferably initially generated by a laser light source, and especially by means of an infrared laser diode.

An especially preferred embodiment of the inventive method uses the first prism having plural side surfaces with respective different tilt angles relative to the rotation axis. In this embodiment of the method, the scanning beam is deflected so that it is scanned line-by-line in successive scan lines, namely in two dimensions, across the scene to be scanned.

The invention achieves the following advantages. It may be carried out in a simple manner with components that can be produced and assembled economically and with little technical effort. It allows the detection or scanning of a rather large angular range of the scene, because the refraction of the light beam upon entering into and exiting from the prism can be fully utilized in addition to the internal total reflection inside the prism, for achieving a strongly varying deflection angle as the prism rotates. In other words, the deflection angle caused by the prism varies more rapidly than would a simple reflection from an external mirror surface of a mirror rotating at the same rotation rate as the inventive prism. Also, a single prism can achieve the scanning in a first dimension as well as the line-by-line shifting of the scan point in a second dimension across the scene, so that two separate scanning devices are not needed for achieving the two-dimensional scanning. As a result, the apparatus has a small structural height, which is not essentially determined by the focal length of any lens arrangement that may be used. It is further possible to use additional deflecting mirrors, if desired, whereby the structural volume of the overall apparatus may be further reduced. Due to the relatively large output or exit opening of the deflected scanning beam, the apparatus and the method have a relatively low sensitivity to contamination or fouling of the optical components and particularly of the surfaces of the prism, the lens, and/or an exit window or the like. The inventive method and apparatus can easily be incorporated into driver support systems in motor vehicles, and particularly spacing distance regulating systems of motor vehicles, object recognition systems, or spacing distance measuring systems.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
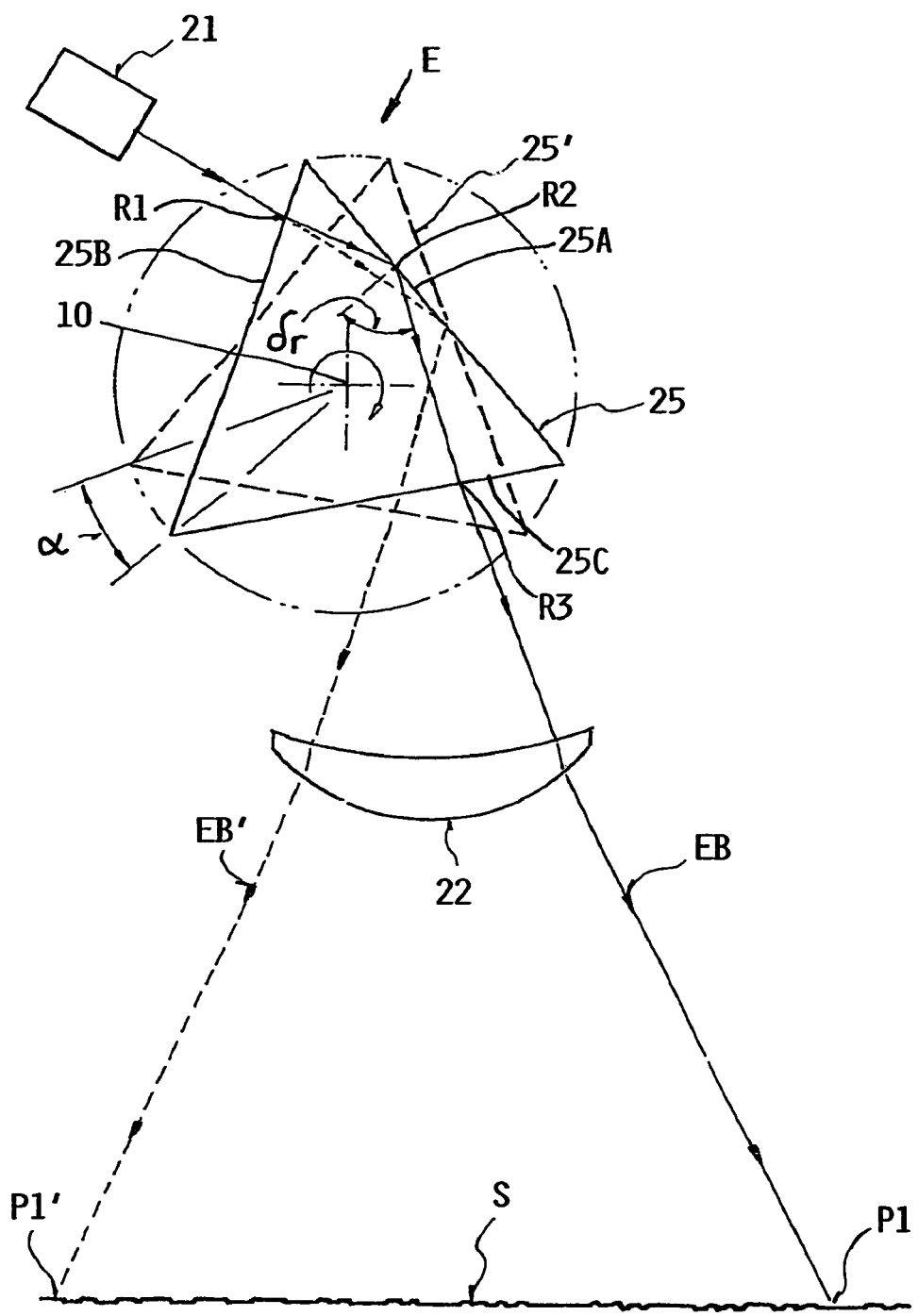
FIG. 1 is a schematic principle diagram of an emitting part of an optical scanning apparatus according to a first embodiment of the invention.
Figure 2:
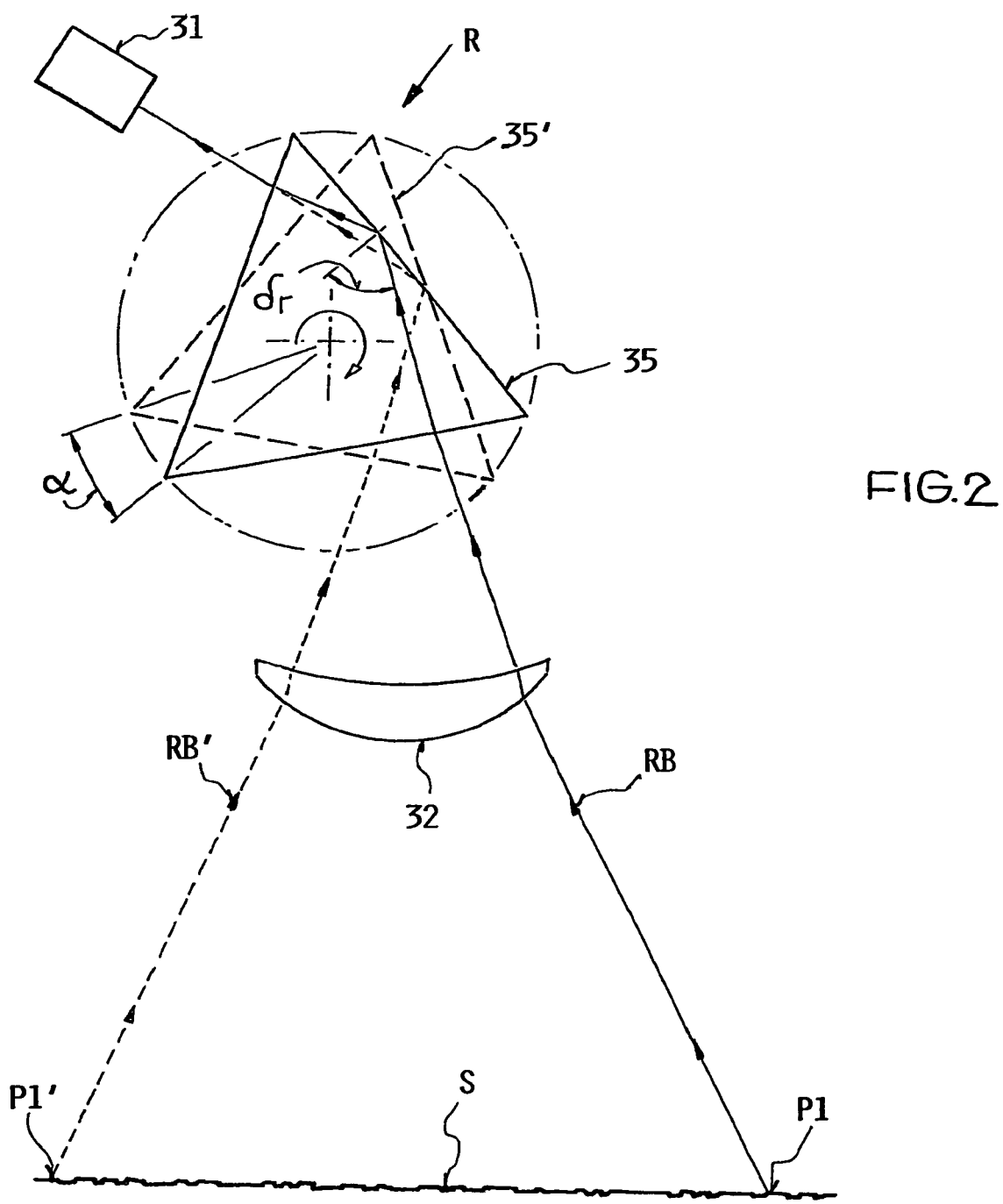
FIG. 2 is a schematic principle diagram of a receiving part of the optical scanning apparatus according to the first embodiment, of which the emitting part is shown in FIG. 1.

A first embodiment of an optical scanning apparatus according to the invention will now be described in detail with reference to FIG. 1 showing the emitting part E, and FIG. 2 showing the receiving part R, of the overall apparatus. This apparatus can be used for carrying out the general embodiment of the inventive method.

As shown in FIG. 1, the emitting part E of the apparatus includes a light source 21, for example embodied as an infrared laser diode, a first prism 25 with an equilateral triangular cross-section bounded by three side surfaces 25A, 25B and 25C, and a lens arrangement 22 embodied as a Fresnel lens, for example. The light source 21, which is arranged at a fixed position with a fixed orientation, emits an emitted light beam EB in a direction toward the prism 25. Namely, the prism 25 is interposed in the beam path of the emitted light beam EB, so that the emitted beam EB penetrates into the body of the prism 25.

Thereby, for example, the emitted beam EB from the light source 21 penetrates through the side surface 25B, where the beam may be refracted at point R1, then is internally reflected in the body of the prism 25 by a total reflection at a point R2 on the inside of the side surface 25A, and then finally the beam exits from the body of the prism 25 through another side surface 25B where the beam may again be refracted at point R3. The refraction angle of the possible refractions at R1 and R3, as well as the reflection angle $\delta_r$ at R2 within the prism 25, depend on the rotational angular position of the prism 25 about the rotation axis 10.

After exiting from the prism 25, the thereby deflected emitted light beam EB passes through the lens arrangement 22, by which it may be further divergently or convergently refracted, so that the emitted beam EB is ultimately projected onto the scene S that is to be scanned. In other words, in this manner, the light emitted by the light source 21 is projected onto and illuminates the point P1 of the scene S. The particular point of the scene S being illuminated at any time depends on the respective angular position of the prism 25 about the rotation axis 10 at that time. Since the prism 25 rotates during the scanning process, the scanning point P, i.e. the point at which the emitted beam EB is directed, will move across the scene S.

Due to the rotation of the prism 25 through the rotation angle α, the prism 25 will be moved from the initial position shown with solid lines to the varied position 25' shown with dashed lines. Thereby, the deflection of the emitted light beam EB caused by the prism 25 will change. Particularly, the reflection angle $\delta_r$ as well as any arising refraction angle of the emitted beam EB as it passes into, through and out of the prism while be reflected therein, will change, so that the emitted beam will now follow the beam path EB' shown in dashed lines. Thus, the light source 21 will now illuminate the point P1' of the scene S. As the prism 25 rotated through the angle α, the illuminated point on the scene S scanned or moved across the scene S from the point P1 to the point P1' along a single scan line. Namely, in this manner, a single line of points across the scene S is scanned by the emitted beam.

Now referring to FIG. 2, the receiving part R of the scanning apparatus is constructed generally analogously to the emitting part E. Thus, the receiving part R comprises a further second prism 35 that is similar to (e.g. has the same congruent configuration, the same material, etc. as) the first prism 25 of the emitting part E, as well as a further second lens arrangement 32 corresponding to the lens arrangement 22 of the emitting part E. Instead of the light source 21 like the emitting part E, the receiving part R comprises a photodetector 31, which is embodied as any conventionally known optical detector element, for example a PIN diode.

The second prism 35 of the receiving part R is rotated in the same manner (i.e. the same direction and same rotation speed) as the first prism 25 of the emitting part E. Advantageously, the two prisms 25 and 35 may be arranged directly adjacent to one another and rigidly connected or bonded to each other, so that they rotate about the same rotation axis 10 with the same rotation speed. Alternatively, the two prisms 25 and 35 could each individually be rotated with the same rotation speed about two separate parallel rotation axes. In any event, the two prisms rotate together, so that when the prism 25 of the emitting part E is in the initial position shown by solid lines in FIG. 1, then the second prism 35 of the receiving part R will also be in the similar initial position shown by solid lines in FIG. 2. In this manner, it is ensured that the receiving prism 35 will always be receiving the incident reflected beam RB from the particular point P of the scene S being illuminated by the emitted beam EB at any time, and will deflect this moving reflected beam RB always at the stationary photodetector 31.

Particularly, in the example position illustrated in FIG. 2 with solid lines, the point P1 of the scene S being illuminated by the light source 21 causes a reflection of at least a portion of the emitted light to form the reflected beam RB that is received and projected through the receiving lens arrangement 32 and the second prism 35 onto the photodetector 31. That is to say, the portion of the emitted light beam EB that is reflected from the point P1 of the scene S gives rise to the reflected beam RB that is directed through the lens arrangement 32 into the second prism 35, where it penetrates into the prism 35, while possibly being refracted depending on the conditions, is then internally reflected in the prism by a total reflection on a side surface of the prism 35, whereupon the reflected beam then exits from the prism 35 while possibly being further refracted, so as to be directed onto the photodetector 31.

Due to the same configuration and same rotation of the two prisms 25 and 35, it is ensured that the respective point being illuminated by the light source 21 at any moment in time will also be imaged onto the photodetector 31 at that moment in time. Namely, if the prism 25 of the emitting part E is rotated further into the position 25' illustrated with dashed lines in FIG. 1, then the second prism 35 will similarly be rotated into the position 35' illustrated with dashed lines in FIG. 2. In this situation, the point P1' of the scene S illuminated by the light source 21 gives rise to the reflected beam RB' that is then similarly received and deflected through the lens arrangement 32 and the second prism 35 (now in the dashed-line position 35') to be deflected and imaged onto the photodetector 31. That is to say, the portion of the emitted beam EB' reflected from the point P1' will give rise to the reflected beam RB' along the beam path shown in dashed lines, through the second lens arrangement 32 to the second prism 35 (now in the position 35'), through which the reflected beam RB' is directed onto the photodetector 31.

In each rotational position, the second prism 35 of the receiving part will simply carry out exactly the opposite total deflection of the received beam as was caused by the first prism 25 in the emitted beam. Thus, the similar configuration of the two prisms 25 and 35, together with the common rotation of the two prisms, will ensure that the respective point of the scene being illuminated by the light source of the emitting part at any time will be the precise point that is also being imaged at that time onto the photodetector of the receiving part. It could be said that the second prism precisely reverses or "undoes" the motion of the scanning point generated by the first prism.

Thus, as the illuminated and detected point P is scanned across the scene S from the point P1 to the point P1', the photodetector 31 will generate or output a signal that provides a continuous measure of the varying reflectivity or reflection factor of the successive points across the scene S. This provides, at any time, a measure of the particular reflection factor of the particular point P being illuminated and imaged at that time. That information can be evaluated by any known pattern, image or object recognition algorithms in order to recognize objects in the scanned scene. Also the transit time of a pulse of the beam from the light source 21 to the detector 31 can be measured to determine the distance to objects being detected in the scene S. These further developments are discussed below.

In the present example embodiment, the two prisms 25 and 35 respectively have the same configuration and may be rigidly connected to each other to thereby rotate about the same single rotation axis 10. In this case, the two prisms can be glued or otherwise bonded to each other at the respective end faces thereof, i.e the end surfaces perpendicular to the rotation axis. In that case, the two prisms are joined together into a two-part prism. Alternatively, a single monolithic prism body could be used, of which a first portion forms the first prism 25 of the emitting part E, and the adjacent second portion forms the second prism 35 of the receiving part R. All of these variations are to be covered by the terms first prism element and second prism element, which may respectively comprise two completely separate prism bodies, or may be joined together to form a two-part prism body, or may comprise two portions of a single monolithic prism body.

The inventive optical scanning apparatus may be incorporated as a component of a system for supporting or aiding the driver of a motor vehicle, for example especially a spacing distance regulation system for a motor vehicle. In this context, the optical scanning apparatus will be arranged so as to scan the scene of the local surroundings in front of the motor vehicle in the forward driving direction. The output of the photodetector, representing the image information scanned and detected from the scene, is then evaluated through pattern recognition algorithms so as to recognize and identify objects located in the surroundings, i.e. in the scene, in front of the motor vehicle. These objects may, for example, especially be preceding motor vehicles driving ahead of the subject vehicle, which may thereby be recognized. Additionally, or alternatively, the spacing distance between the subject vehicle and a preceding vehicle or other object located in front of the subject vehicle can be determined by evaluating the signal transit time of the signal emitted as the emitted light beam EB and received back as the reflected beam RB. From this transit time, e.g. of a pulsed light signal, the spacing distance can be determined. From this spacing information, the system can monitor or test whether the required safe spacing distance is being maintained relative to the preceding vehicle for a given driving speed. If the required safe spacing or following distance is not being maintained, the system can emit a warning signal to the driver, or carry out an automatic spacing distance regulation of this spacing distance, e.g. through automatic application of the vehicle brakes or the like.

Another application of the inventive optical scanning apparatus is to scan and evaluate the scene or local surroundings to the side of the motor vehicle, for example in the driving lane or the road shoulder adjacent to the motor vehicle. Thereby, any road markings, for example provided on the road surface as lane marker lines to divide adjacent driving lanes from each other or to separate the driving lane from the breakdown lane or shoulder, can be evaluated and recognized by the system. In the event that the vehicle is moving laterally out of the present driving lane, as recognized by the approach toward the lane markers or the like, the driver can be warned thereof, or an automatic steering program can be activated to maintain the vehicle within the original driving lane.

Figures 3, 4:
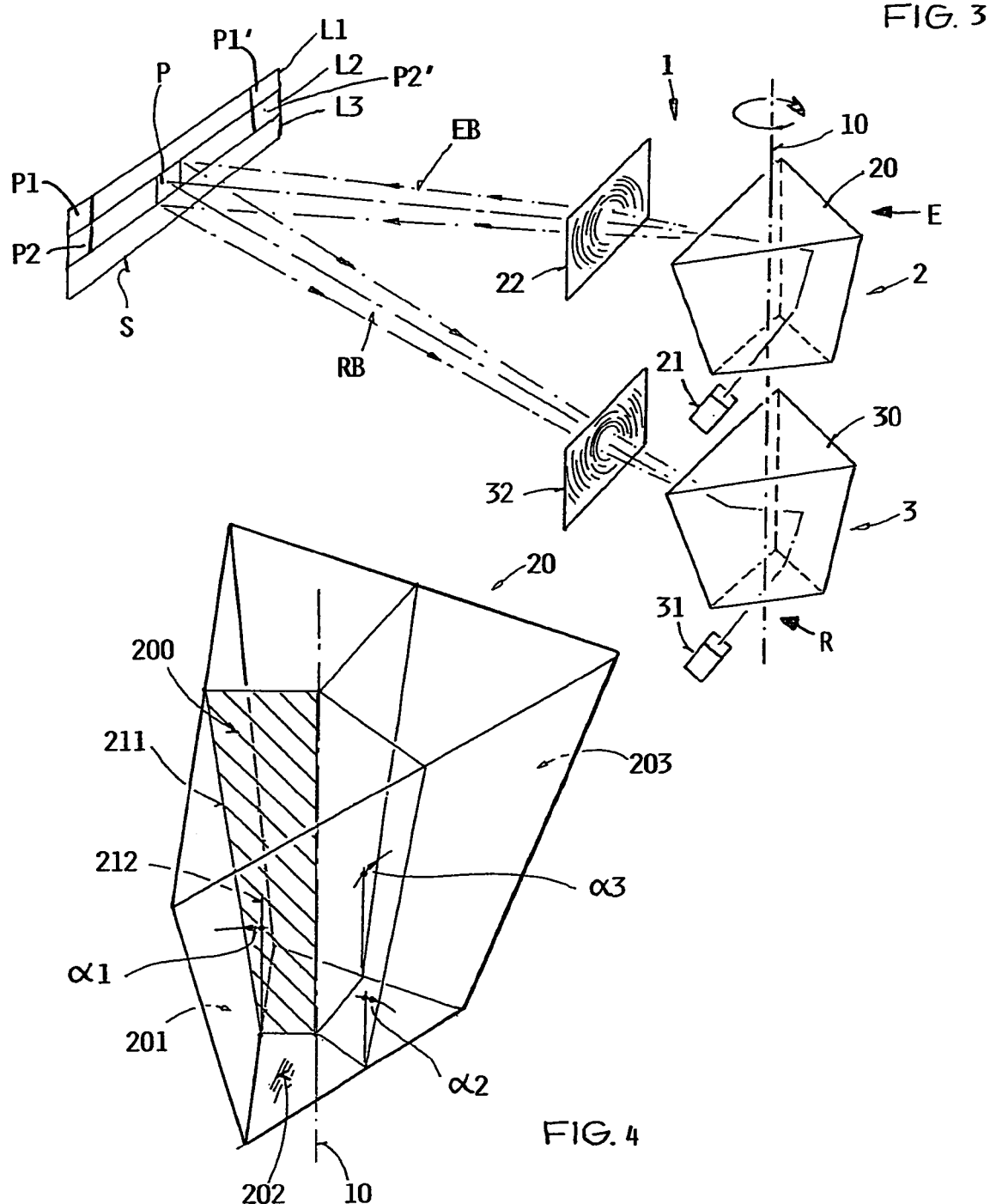
FIG. 3 is a schematic principle diagram of a further developed second embodiment of an optical scanning apparatus for scanning a scene in several scanning planes according to the invention.
FIG. 4 is an enlarged schematic perspective view of a single prism of the apparatus according to FIG. 3.

FIGS. 3 and 4 show a further embodiment of the optical scanning apparatus 1, such as the optical spacing distance measuring system 1 according to the invention, with a further developed and specialized configuration of the prisms 20 and 30. The overall construction and arrangement of this apparatus 1 is similar to that discussed above in connection with FIGS. 1 and 2. Thus, the apparatus 1 includes an emitting part E and a receiving part R as follows.

The emitting part E comprises a first prism element 2 such as an individual first prism 20 that is rotatable about a rotation axis 10, a radiation beam source 21 such as an infrared laser diode, and a lens arrangement 22 such as a Fresnel lens. The receiving part R is embodied generally analogously to the emitting part E. It is distinguished from the emitting part E, however, in that the beam source 21 of the emitting part E is instead replaced by a photodetector 31 such as a PIN diode in the receiving-part R. Namely, the receiving part R comprises a receiving prism element 3, for example an individual receiving prism body 30, which has the same configuration, dimensions, material and the like, as the emitting prism 20. The receiving part R further comprises a receiving lens arrangement 32 embodied the same as the emitting lens arrangement 22. The two prisms 20 and 30 are positioned one above the other and are rotated in common together about the same single rotation axis 10 during the scanning process.

In the above described regards, the apparatus according to FIG. 3 generally corresponds to the structure and operation of the apparatus and method according to FIGS. 1 and 2. A special embodiment of this apparatus will now be described further in connection with FIGS. 3 and 4. In this embodiment, each prism 20 and 30 comprises plural side surfaces that are respectively tilted at different tilt angles relative to the rotation axis 10. Thus, the deflection of the emitted beam EB will be carried out progressively to be scanned from the point P1 to the point P1' across a single line of the scene S as described above in connection with FIGS. 1 and 2, respectively for each one of the side surfaces of the prism. However, since the several side surfaces of each prism respectively have different tilt angles relative to the rotation axis 10, this scanning deflection of the emitted beam EB will thus be carried out along plural scanning planes that are respectively individually associated with the individual side surfaces of the prism. Namely, each scanning plane will be oriented at a different angle dependent on and correlated to the different tilt angles of the respective side surfaces of the prism. The respective position of each of the scanning planes will be determined by the respective tilt angle of the particular side surface that is reflecting and scanning the emitted beam along that scanning plane. A change or transition from one scanning plane to the next will occur each time that the continuing rotation of the prism moves one side surface out of the beam path and the next side surface into the beam path of the emitted beam penetrating into the prism.

FIG. 4 is a detailed perspective illustration of a corresponding emitting prism 20 of the embodiment of the apparatus as shown in FIG. 3. This prism 20 has a triangular cross-section bounded by three side surfaces 201, 202 and 203, which each respectively have different tilt angles $\alpha 1$, $\alpha 2$ and $\alpha 3$ relative to the rotation axis 10. The tilt angle $\alpha 1$ between the side surface 201 and the rotation axis 10 is defined as the angle between a line segment 212 extending parallel to the rotation axis 10 and a second line 211 that represents the intersection of the side surface 201 with a section plane 200 lying in and extending from the rotation axis 10 to intersect perpendicularly with the side surface 201. The other tilt angles $\alpha 2$ and $\alpha 3$ of the side surfaces 202 and 203 are defined in a similar manner. Another way of defining these tilt angles is simply to consider the angle of the intersection of the extended plane of the respective side surface with a plane extending along the rotation axis 10 so that the two planes intersect each other along a line perpendicular to the axis 10.

During the optical scanning process, the light radiation source 21 emits an unbundled or uncollimated light beam forming the emitted scanning beam EB, in a direction toward the emitter prism 20. In this regard, the light source 21 is positioned relative to the prism 20 in such a manner so that the emitted scanning beam EB is emitted along a plane that is perpendicular or normal to the rotation axis 10 and impinges and penetrates into the prism 20. As already described above, the emitted beam EB may be refracted as it passes through the respective side surface of the prism 20, by a refraction value that is dependent on the momentary angular position of the prism 20 as well as the tilt angle of this side surface. Then, within the body of the prism 20, the emitted beam EB is deflected by total internal reflection from another one of the side surfaces of the prism 20, whereby the beam is then directed to the next side surface of the prism 20, through which the emitted beam EB exits the body of the prism 20 while again being refracted. The deflected emitted beam EB exiting from the prism 20 then passes through the lens arrangement 22, which serves to bundle, collimate or focus the emitted beam EB onto a scanning surface, which could be a virtual plane, of the scene S that is to be scanned.

Thus, at any moment in time, the emitted beam EB illuminates a particular scanning point P on the scanning surface of the scene S, and this scanning point P is scanned across the image in a single scan line due to the rotation of the prism 20. The focusing provided by the lens arrangement 22, in connection with the original beam parameters of the emitted beam EB as output by the source 21, and in connection with the refraction characteristics and the like provided by the prism 20, are designed so that the focused deflected emitted beam EB is projected onto the scene S with a prescribed angular field of the point P, for example a vertical beam angle of 3°, and a horizontal beam angle of 1°. This prescribed angular field of the emitted beam EB, in connection with the distance between the apparatus 1 and the scene S, will determine the dimensions of the projected or illuminated scanning point P that is illuminated by the beam EB on the scene S at any given time.

Whenever a reflective object is located at the scanning point P in the scene S, then at least a portion of the light of the emitted beam EB will be reflected from this object at the scanning point P as a reflected beam RB, directed back to the receiving part R. This reflected beam RB is received via the receiving lens arrangement 32 and thereby focused or imaged onto the receiving prism 30, through which it is refracted and deflected onto the photodetector 31. Thereby, the refraction and internal total reflection of the reflected beam RB through the prism 30 corresponds to the refraction and reflection of the emitted beam EB through the prism 20. Due to the identical configuration, dimensions, etc. of the prisms 20 and 30, and due to the respectively corresponding positioning of the light beam source 21 relative to the prism 20 and of the photodetector 31 relative to the prism 30, it is ensured that the photodetector 31 will receive and detect the reflected beam RB that arises from the emitted beam EB projected onto the scanning point P of the scene S at any moment in time.

As described above, during the scanning process, the two prisms 20 and 30 are rotated in common about the rotation axis 10, which leads to a variation of the reflection angles of the emitted beam EB and the reflected beam RB respectively in the interior of the prisms 20 and 30 dependent on the variation of the rotational angular position of the respective prism. Due to the variation of the reflection angle in the prism 20, the emitted beam EB is pivoted or scanned in a direction extending perpendicular to the rotation axis 10. For example, if the rotation axis 10 is oriented vertically, thereby the emitted beam EB will be scanned in a horizontal direction across the scene S as the scanning point P is moved, for example from point P1 to point P1'. This single line scan from point P1 to P1' is achieved due to the varying deflection of the emitted beam EB by a single one of the side surfaces of the prism 20, as the prism 20 is rotated through the rotation angle α as described above in connection with FIG. 1.

Then, as the prism 20 rotates further, the next adjacent side surface of the prism 20 will be rotated into the beam path of the emitted beam EB penetrating into the prism 20. Thus, at this point, from the transition from one side surface to the next, the deflection of the emitted beam will "jump" from the first side surface to the next. Since the next side surface has a different tilt angle $\alpha 1$, $\alpha 2$ or $\alpha 3$ relative to the preceding side surface, the new deflection of the emitted beam EB will be along a next one of plural scanning planes that lie angularly one above (or below) another. The angular positions or orientations of these scanning planes are determined by the respective tilt angles $\alpha 1$, $\alpha 2$ and $\alpha 3$ of the side surfaces 201, 202 and 203 of the prism 20. Then, as the prism 20 rotates further, the varying rotational angle of the respective "active" side surface of the prism 20 will once again cause a horizontal scanning of the scanning point P across the next line of the scene S, for example from the point P2 to the point P2'. Thus, a configuration of the prism 20 with three side surfaces 201, 202 and 203 at successive different tilt angles $\alpha 1$, $\alpha 2$ and $\alpha 3$ will result in three scan lines L1, L2 and L3 successively across the scene S. Thereby, the width (i.e. in this embodiment the vertical height) of each one of the scan lines L1, L2 and L3 is determined by the vertical dimension of the scanning point P as described above.

The tilt angles $\alpha 1$, $\alpha 2$ and $\alpha 3$, and especially the differences therebetween, are preferably selected to be relative small angles with particular values so that no gaps will arise between the successive scan lines L1, L2 and L3, but instead that the scan lines L1, L2 and L3 will at most very slightly overlap one another successively. In this regard, the scan lines L1, L2 and L3 are not exactly parallel to each other due to the different tilt angles $\alpha 1$, $\alpha 2$ and $\alpha 3$, and also depending on the existing orientation of the scene S relative to the apparatus 1, and the like. It has been determined that the values $\alpha 1=2°$, $\alpha 2=3°$, and $\alpha 3=4°$ satisfy the requirements discussed above. While this example relates to a triangular prism with three side surfaces, similar considerations apply to other prism cross-sectional shapes, for example any n-sided polygon shape with the number n of side surfaces.

The above describe apparatus 1 can be regarded as a spacing distance radar system for use in a driver support or assistance system in a motor vehicle, especially in a spacing distance regulating system for a motor vehicle. In this context, the spacing distance radar system serves as a sensor for generating two dimensional spacing distance images of the scene existing in front of the motor vehicle in the driving direction. As discussed above, such a system can further involve determining spacing distance values by evaluating the signal transit time of the emitted beam and the reflected beam arising therefrom. Also, by evaluating the image information, it is possible to recognize objects, and especially preceding vehicles, located in front of the subject motor vehicle, and then to warn the driver of the subject vehicle of dangerous driving situations, and/or to automatically control the driving speed in order to achieve an automatic spacing distance regulation.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for optically scanning a scene comprising:
   an emitting part adapted to project an optical emitted beam onto the scene and to move the emitted beam relative to the scene; and
   a receiving part adapted to receive and detect a reflected beam arising from a reflection of the emitted beam from the scene;

wherein said emitting part comprises:
an optical radiation source adapted to generate and emit the emitted beam;
a first prism element that is bounded by plural side surfaces, and that is rotatable about a first rotation axis, and that is positioned in a beam path of the emitted beam emitted by the optical radiation source so that the emitted beam penetrates into said first prism element and is deflected by an internal total reflection of the emitted beam from a respective one of said side surfaces of said first prism element dependent on a rotational position of said first prism element.

2. The apparatus according to claim 1, wherein said first prism element is so adapted and is positioned in the beam path of the emitted beam so that the emitted beam is further deflected by refraction upon penetrating into and/or upon exiting from said first prism element, whereby a total deflection of the emitted beam caused by said first prism element includes the refraction and the internal total reflection of the emitted beam.

3. The apparatus according to claim 1, wherein said emitting part includes only a single rotatable prism being said first prism element and does not include any other rotatable prism in the beam path of the emitted beam between said optical radiation source and the scene.

4. The apparatus according to claim 1, wherein said emitting part further comprises a first lens arrangement that is interposed in the beam path of the emitted beam between said first prism element and the scene, and that is adapted to focus the emitted beam onto the scene.

5. The apparatus according to claim 1, wherein said receiving part comprises:
a photodetector adapted to detect the reflected beam; and
a second prism element that includes plural side surfaces and has a same configuration as said first prism element, and that is rotatable about a second rotation axis synchronously and in a same rotation direction as a rotation of said first prism element about said first rotation axis, and that is positioned in a beam path of the reflected beam coming from the scene so that the reflected beam penetrates into said second prism element and is deflected by an internal total reflection of the reflected beam from a respective one of said side surfaces of said second prism element dependent on a rotational position of said second prism element, and the reflected beam is thereby directed onto said photodetector.

6. The apparatus according to claim 5, wherein said receiving part further comprises a second lens arrangement that is interposed in the beam path of the reflected beam between the scene and said second prism element, and that is adapted to focus the reflected beam.

7. The apparatus according to claim 5, wherein said first prism element and said second prism element are respective discrete individual first and second prism bodies, and wherein said first rotation axis and said second rotation axis are spaced apart and parallel relative to one another.

8. The apparatus according to claim 5, wherein said first prism element and said second prism element are respective discrete individual first and second prism bodies, and wherein said first rotation axis and said second rotation axis are coincident with one another along a single axis.

9. The apparatus according to claim 5, wherein said first prism element and said second prism element are respective first and second portions of a single monolithic prism body, and wherein said first rotation axis and said second rotation axis are coincident with one another along a single axis.

10. The apparatus according to claim 1, wherein said plural side surfaces of said first prism element are respectively tilted at respective different tilt angles relative to said first rotation axis, such that the emitted beam is deflected respectively along different deflection planes at different angles relative to said first rotation axis by the internal total reflection of the emitted beam respectively by different ones of said side surfaces as said first prism element rotates.

11. The apparatus according to claim 10, wherein said tilt angles are selected so that said deflection planes respectively give rise to plural scanning lines of the emitted beam being scanned successively across the scene, without gaps between successive ones of the scanning lines.

12. The apparatus according to claim 10, wherein said first prism element has a total of exactly three of said side surfaces, which respectively have said different tilt angles being 2°, 3° and 4° respectively.

13. A method of using the apparatus according to claim 1, comprising the steps:
a) projecting said emitted beam from said emitting part onto said scene being a scene of an environment surrounding a motor vehicle;
b) receiving said reflected beam with said receiving part;
c) evaluating said reflected beam by pattern recognition of a progression of reflection values of said reflected beam over time, so as to recognize objects in said environment surrounding said motor vehicle.

14. A method of using the apparatus according to claim 1, comprising the steps:
a) projecting said emitted beam from said emitting part onto said scene being a scene of an environment surrounding a motor vehicle;
b) receiving said reflected beam with said receiving part;
c) evaluating a transit time of a signal pulse emitted in said emitted beam and received as a reflection in said reflected beam to determine therefrom a spacing distance between said motor vehicle and an object in said environment surrounding said motor vehicle; and
d) depending on and responsive to said spacing distance determined in said step c), emitting a warning or actuating a spacing distance regulation.

15. An apparatus for optically scanning a scene comprising:
an emitting part adapted to project an optical emitted beam onto the scene and to move the emitted beam relative to the scene; and
a receiving part adapted to receive and detect a reflected beam arising from a reflection of the emitted beam from the scene;
wherein said emitting part comprises:
a first prism element that is rotatable about a first rotation axis, and that is bounded by plural side surfaces which are respectively tilted at different tilt angles relative to said first rotation axis; and
an optical radiation source adapted to generate the emitted beam and arranged to emit the emitted beam toward said first prism element so that the emitted beam penetrates into said first prism element and is deflected by an internal total reflection from a respective one of said side surfaces.

16. A method of optically scanning a scene, comprising the steps:
a) generating and emitting an emitted beam of light;
b) rotating a first prism element bounded by plural side surfaces about a first rotation axis; and
c) deflecting said emitted beam onto said scene using said first prism element, wherein said deflecting comprises penetrating said emitted beam into said first prism element and internally reflecting said emitted beam in said first prism element by a total reflection of said emitted beam from a respective one of said side surfaces;

wherein said rotating of said first prism element during said deflecting causes said emitted beam to be moved over said scene.

17. The method according to claim 16, wherein said deflecting of said emitted beam further comprises refracting said emitted beam upon entering into and/or exiting from said first prism element.

18. The method according to claim 16, further comprising, after said step c), projecting said emitted beam through a first lens arrangement onto said scene.

19. The method according to claim 16, further comprising reflecting at least a portion of said emitted beam from said scene to form a reflected beam, and deflecting said reflected beam by an internal total reflection thereof in said first prism element or in a second prism element having the same configuration as said first prism element so as to direct said reflected beam onto a photodetector.

20. The method according to claim 19, further comprising passing said reflected beam through a second lens arrangement.

21. The method according to claim 19, wherein said deflecting of said reflected beam comprises using said second prism element, and further comprising rotating said second prism element with the same rotation speed in the same rotation direction as said first prism element about said first rotation axis or about a second rotation axis parallel to said first rotation axis.

22. The method according to claim 16, wherein said plural side surfaces of said first prism element are respectively oriented with respective different tilt angles relative to said first rotation axis, and wherein said deflecting comprises successively reflecting said emitted beam from successive ones of said side surfaces in succession as said first prism element is rotated, whereby said successive ones of said side surfaces respectively reflect said emitted beam along respective differently angled deflection planes dependent on said different tilt angles, and said differently angled deflection planes respectively give rise to successive scan lines of said emitted beam being moved over said scene.

23. The method according to claim 16, wherein said step a) comprises generating said emitted beam as a beam of laser light.

24. The method according to claim 16, further comprising determining a spacing distance between a motor vehicle and an object in said scene being an environment in front of said vehicle by evaluating a reflected signal arising from a reflection of said emitted beam from said object.

* * * * *